Schuyler & Crowninshield.
Pitchfork.
Nº 85,699. Patented Jan. 5, 1869.
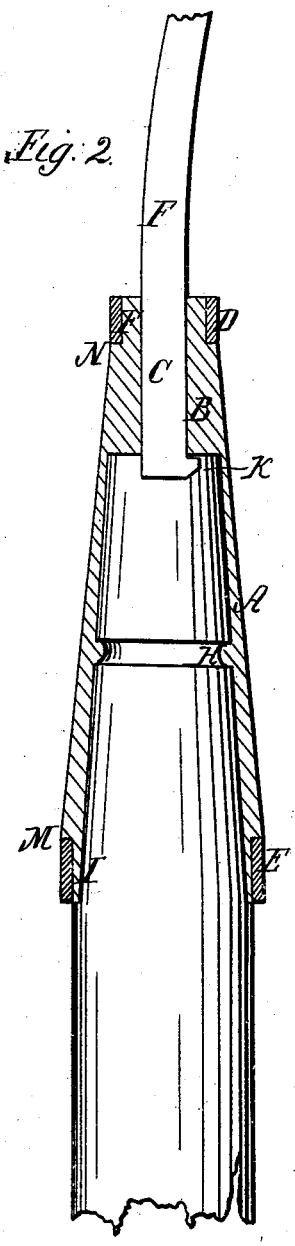
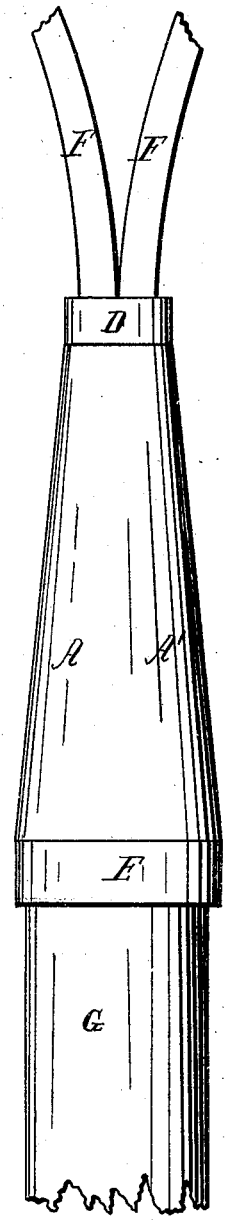
Witnesses:
Bruson Owens
A. R. Palmer
Inventors:
Rensselaer Schuyler
William Crowninshield

United States Patent Office.

RENSSELAER SCHUYLER AND WILLIAM CROWNINSHIELD, SENECA FALLS, NEW YORK.

Letters Patent No. 85,699, dated January 5, 1869.

---

IMPROVEMENT IN PITCHFORKS.

---

The Schedule referred to in these Letters Patent and making part of the same.

---

*To all whom it may concern:*

Be it known that we, RENSSELAER SCHUYLER and WILLIAM CROWNINSHIELD, of the town of Seneca Falls, in the county of Seneca, and State of New York, have invented a new and useful Improvement in Pitchforks; and we do hereby declare that the following is a full, clear, and exact description of the construction and operation of the same, reference being had to the annexed drawings, making a part of this specification.

Our improvement relates to the construction of pitchforks used by hand, and consists in the means combined to attach and fasten securely the tines of the fork, each made separate from the other, to its handle, in such manner as to be readily replaced, when required.

The tines are made in the usual manner and form, except that instead of being fast together at the shank, as ordinarily but not always constructed, they are each made in a separate piece, with a shank to each tine, formed as described.

In the drawings referred to—

Figure 1 is a perspective view, and

Figure 2 is a longitudinal section in the direction of the line from D to E, fig. 1 representing the head and parts of the tines and handle in position, as constructed, and Figure 3 represents a section of the solid part B of the head A. The section of A', being the same in form, is not shown. The slot C' is shown in section in this figure.

The head A A' is cast in two equal parts, divided longitudinally through its centre, as represented by the line from D to E, fig. 1. One of these parts is shown at A, fig. 2.

The lower end, B, which receives the shank C of the tine F, is solid, for the distance of about one-fourth part of the length of the head.

A slot runs centrally, in the direction of its length, along and in this solid portion of the head B through it, which is shown in section at C', fig. 3, and with the tine in place at C, fig. 2. This slot is of suitable dimensions to receive the shank C of the tine F.

The shank fits the slot closely in its whole length, and is flush with the flat surface of the solid part of the head, so that when in position the shanks of the tines bear firmly on the side of the slots and on each other.

If more than two tines are used in the fork, the slots are increased in depth, and the diameter of the head is made to correspond with such increase.

The divided head A A' is of a truncated conical form, when the parts are placed together in position. It may be cast of malleable iron, about four and a half inches long, and seven-eighths of an inch in diameter at the lower end, and one inch and a half at the upper, (including the thickness of the ferrules D and E.)

That portion of each end of the head corresponding in length with the width of the ferrules D and E is diminished by near the thickness of the ferrules, so as to leave the square shoulders M and N.

From the solid part, the head A A' extends into a socket, as shown in fig. 2, to receive the handle G.

On the inner surface of this socket are slight corrugations, or, as shown in fig. 2, the flange H, rising about one-twelfth of an inch from the surface, extends around the inside of the socket.

The tines F F have each a square shank, or nearly square, which fit the slot C'.

This shank C has a projecting lip, K, which bears on the solid part of the head, as shown, and is formed to fit the slot, and bear firmly on its sides and on the shank of the adjacent tine.

The ferrules D and E, made of wrought-iron, or other suitable metal, or cast of malleable iron, are of suitable dimensions to fit their respective bearings on the ends of the head A A'. Their inner diameters are a little less where they bear at the end than at the point where they bear at the shoulders N and M respectively, so as to draw when driven on. The bearings have the like form.

To put the fork together, the tines F F are placed in position, the shanks in their respective slots, the lip K bearing against the solid part B of the head; the ferrule D is put on over one tine, and the other tine passed through it; the handle, with the ferrule E on its lower end, is put in the socket bearing against the solid part B; the two parts of the head A A' are pressed together and the ferrules driven home, by which the whole is firmly secured in position for use.

To repair, the ferrules are started off, and a tine can be replaced in a few minutes.

The advantages of our invention are in obtaining a firm metallic bearing of the shanks of the tines, the entire length of such shanks; securing the handle G in the socket by means of the flange H, or corrugation, as described; and the facility with which a broken tine may be replaced.

We do not claim any of the separate parts described as in themselves, and separate from their combination, new, or of our invention; but

What we claim as our invention, and desire to secure by Letters Patent, is—

1. The fork-head, cast in two separate parts A and A', with a flange or corrugation on the inner surface of the socket, constructed and operating in the manner and for the purpose described.

2. The arrangement and combination of the divided fork-head A A' with the ferrules D and E, by which the tines F F are secured upon the handle G, in such manner as to be replaced with facility, the whole operating as described.

RENSSELAER SCHUYLER.
WILLIAM CROWNINSHIELD.

Witnesses:
BENSON OWEN,
A. R. PALMER.